March 6, 1951      D. L. DAILY      2,543,896
CHRISTMAS TREE STAND
Filed March 29, 1946
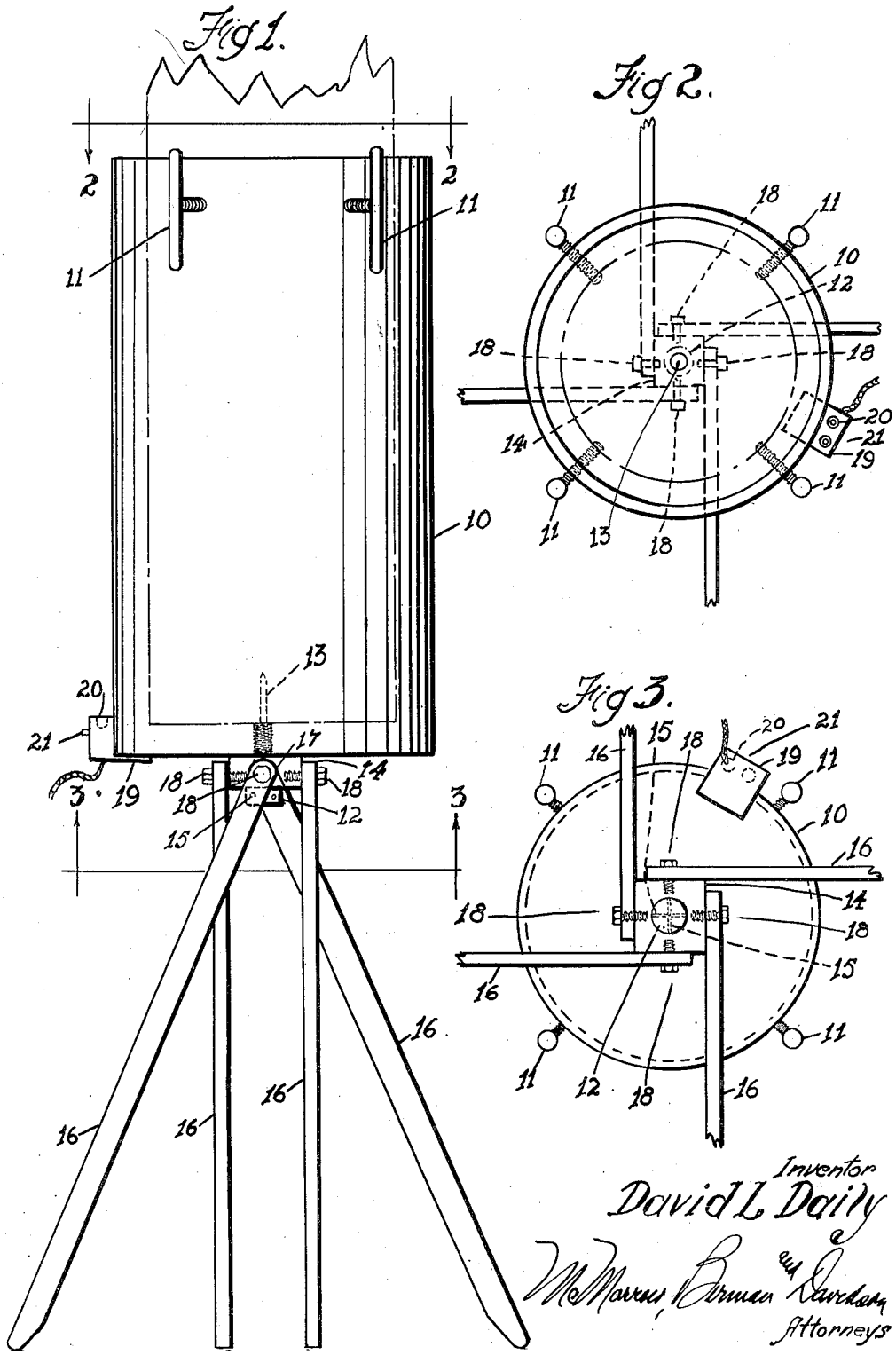

Patented Mar. 6, 1951

2,543,896

UNITED STATES PATENT OFFICE 2,543,896

CHRISTMAS TREE STAND

David L. Daily, Birmingham, Ala.

Application March 29, 1946, Serial No. 658,113

1 Claim. (Cl. 248—44)

My invention relates to tree stands and more particularly to Christmas tree stands.

The object of my invention is to provide a Christmas tree stand adapted to receive and firmly hold a tree in upright position.

Another object of my invention is to provide a Christmas tree stand comprising a water container and adapted to support the tree inside this container in order to keep the tree fresh and green and to reduce thereby the fire hazard to a minimum.

Other objects of my invention may appear in the following specification describing my invention with reference to the accompanying drawing illustrating a preferred embodiment thereof. It is however to be understood that my invention is not to be limited or restricted to the exact construction and combination of parts described in the specification and shown in the drawing, but that such changes and modifications can be made, which fall within the scope of the claim appended hereto.

In the drawing:

Figure 1 is an elevational view of a Christmas tree stand according to my invention.

Figure 2 is a top plan view of Figure 1, and

Figure 3 is a bottom plan view of Figure 1.

Referring now in detail to the drawing, the tree stand according to my invention has a container 10 preferably shaped like a can. This container is open at the top and closed at the bottom. Adjacent the upper edge four wing screws 11 extend through the circumferential wall of the container and are arranged at a distance of 90 degrees from each other.

In the center of the bottom a round head screw 12 is threadedly arranged and extends upwardly into the container 10. A pointed pin or nail 13 is inserted into the screw 12, into which an axially extending hole is drilled to receive the nail. The nail extends upwardly and the butt end of a tree is fastened onto the nail. The four wing screws are then tightened to engage the tree trunk and to steady it in upright position.

A machined square block 14 is provided with a centrally located hole, through which the round head screw extends. By tightening this screw the block 14 is forced firmly against the bottom of the container so that leakage is prevented, when the container is filled with water. To facilitate the tightening of the bolt or screw 14 two holes 15 are bored diametrically through the round head of this screw and extend at right angles to each other.

In each vertical side of the square block 14 a tapped hole is provided.

The tree stand has four legs 16 which have preferably a rectangular cross section. The upper end of each leg 16 is rounded as shown at 17 in Figure 1 and a screw 18 extends through each leg adjacent this rounded end. The screws 18 engage the tapped holes in the square block 14. In this manner the legs 16 can be adjusted to extend in any desired angle to each other. It is easy to see that the farther the legs are adjusted from each other the more safely will the tree stand support the tree.

On the bottom of the container a small bracket 19 is fastened, for instance by welding. An electric connecting socket 20 is provided on this bracket and an electric switch 21 is connected therewith. This facilitates the lighting of the tree by electric light strings.

When the tree stand is not in use the legs can be folded close together so that the stand does require only very little storage space.

Having described my invention I claim as new and desire to secure by Letters Patent:

A Christmas tree stand, comprising an upright container having its top open and provided in its bottom with a central screw-threaded opening, a vertical bolt engaging upwardly within the central screw-threaded opening and extending through the bottom and having a head arranged below and spaced from the bottom, a rectangular block of substantial thickness mounted upon the bolt beneath the bottom and clamped between the bottom of the container and the head of the bolt and having its sides disposed vertically, the block being substantially narrower than the container, horizontally disposed screws engaging in the vertical sides of the block and projecting outwardly thereof, legs pivotally mounted upon the screws and having inner vertical faces slidably contacting the vertical sides of the block, the legs being swingable in the vertical planes of the sides of the block, the legs being arranged bodily below and close to the bottom of the container and laterally inwardly of its side, the bolt being provided in its upper end with a recess, a vertical pin removably mounted within the recess and projecting above the bottom of the container, and horizontal adjusting screws mounted upon the side of the container for engagement with the trunk of the tree to position the same within the container.

DAVID L. DAILY.

REFERENCES CITED

The following references are of record in the file of this patent:

UNITED STATES PATENTS

| Number | Name | Date |
|---|---|---|
| 626,514 | Wagner | June 6, 1899 |
| 1,480,018 | Sienbenlist | Jan. 8, 1924 |
| 1,551,093 | Fletcher | Aug. 25, 1925 |
| 1,721,980 | Wardell | July 23, 1929 |
| 1,805,649 | Wermine | May 19, 1931 |
| 2,159,760 | Fitzgerald | May 23, 1939 |